(12) United States Patent
Allen et al.

(10) Patent No.: US 10,805,254 B1
(45) Date of Patent: Oct. 13, 2020

(54) REPRESENTATION OF CONTENT VIEWERS

(71) Applicant: Snap Inc., Santa Monica, CA (US)

(72) Inventors: Nicholas Richard Allen, Venice, CA (US); Jacob Andreou, Venice, CA (US); Sebastian Gil, Venice, CA (US); Michael Heyeck, Venice, CA (US); Jeremy Voss, Venice, CA (US)

(73) Assignee: Snap Inc., Santa Monica, CA (US)

( * ) Notice: Subject to any disclaimer, the term of this patent is extended or adjusted under 35 U.S.C. 154(b) by 63 days.

(21) Appl. No.: 15/890,259

(22) Filed: Feb. 6, 2018

Related U.S. Application Data

(60) Provisional application No. 62/455,260, filed on Feb. 6, 2017.

(51) Int. Cl.
*H04L 12/58* (2006.01)
*H04L 29/08* (2006.01)
*G06F 3/0482* (2013.01)
*G06Q 50/00* (2012.01)

(52) U.S. Cl.
CPC ............ *H04L 51/32* (2013.01); *G06F 3/0482* (2013.01); *H04L 67/20* (2013.01); *G06Q 50/01* (2013.01)

(58) Field of Classification Search
CPC ........ H04L 51/32; H04L 67/20; G06F 3/0482
USPC ...................................................... 709/206
See application file for complete search history.

(56) References Cited

U.S. PATENT DOCUMENTS

| | | | |
|---|---|---|---|
| 6,038,295 A | 3/2000 | Mattes | |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |

(Continued)

FOREIGN PATENT DOCUMENTS

CA  2887596 A1  7/2015

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

(Continued)

*Primary Examiner* — Glenford J Madamba
(74) *Attorney, Agent, or Firm* — Schwegman Lundberg & Woessner, P.A.

(57) ABSTRACT

Systems, devices, media, and methods are presented for graphically representing content viewers, within a user interface, from social networking interrelations between viewers and producers. The systems and methods receive an indication of a positive connection state for a first member and a second member. The positive connection state is validated by identifying a server link between the first member and the second member. In response to validating the positive connection state, an identification for the first member is transmitted to a second client device associated with the second member. A selection is received for a selection of a user interface presented on the second device. In response to receiving the selection from the second device, the identification of the first member is presented within the user interface on the second device.

15 Claims, 11 Drawing Sheets

(56) References Cited

U.S. PATENT DOCUMENTS

| | | |
|---|---|---|
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 2011/0202598 A1 | 8/2011 | Evans et al. |
| 2012/0123830 A1* | 5/2012 | Svendsen ........... G06Q 30/0252 705/14.5 |
| 2012/0124479 A1* | 5/2012 | Morin ................... G06Q 10/10 715/741 |
| 2012/0209924 A1 | 8/2012 | Evans et al. |
| 2016/0063277 A1* | 3/2016 | Vu ........................ G06F 21/105 726/4 |

OTHER PUBLICATIONS

"Surprise!", [Online] Retrieved from the Internet: <URL: https://www.snap.com/en-US/news/post/surpirse>, (Oct. 3, 2013), 1 pg.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

* cited by examiner

US 10,805,254 B1

REPRESENTATION OF CONTENT VIEWERS

RELATED APPLICATIONS

This application claims the priority benefit of U.S. Provisional Application No. 62/455,260, entitled "REPRESENTATION OF CONTENT VIEWERS," filed Feb. 6, 2017, which is hereby incorporated herein by reference in its entirety.

TECHNICAL FIELD

Embodiments of the present disclosure relate generally to representation of content viewers. More particularly, but not by way of limitation, the present disclosure addresses systems and methods for graphically representing content viewers, within a user interface, from social networking interrelations between viewers and producers.

BACKGROUND

Telecommunications applications and devices can provide communication between multiple users using a variety of media, such as text, images, sound recordings, or video recording. For example, video conferencing allows two or more individuals to communicate with each other using a combination of software applications, telecommunications devices, and a telecommunications network.

BRIEF DESCRIPTION OF THE DRAWINGS

Various ones of the appended drawings merely illustrate example embodiments of the present disclosure and should not be considered as limiting its scope.

Figure 1:
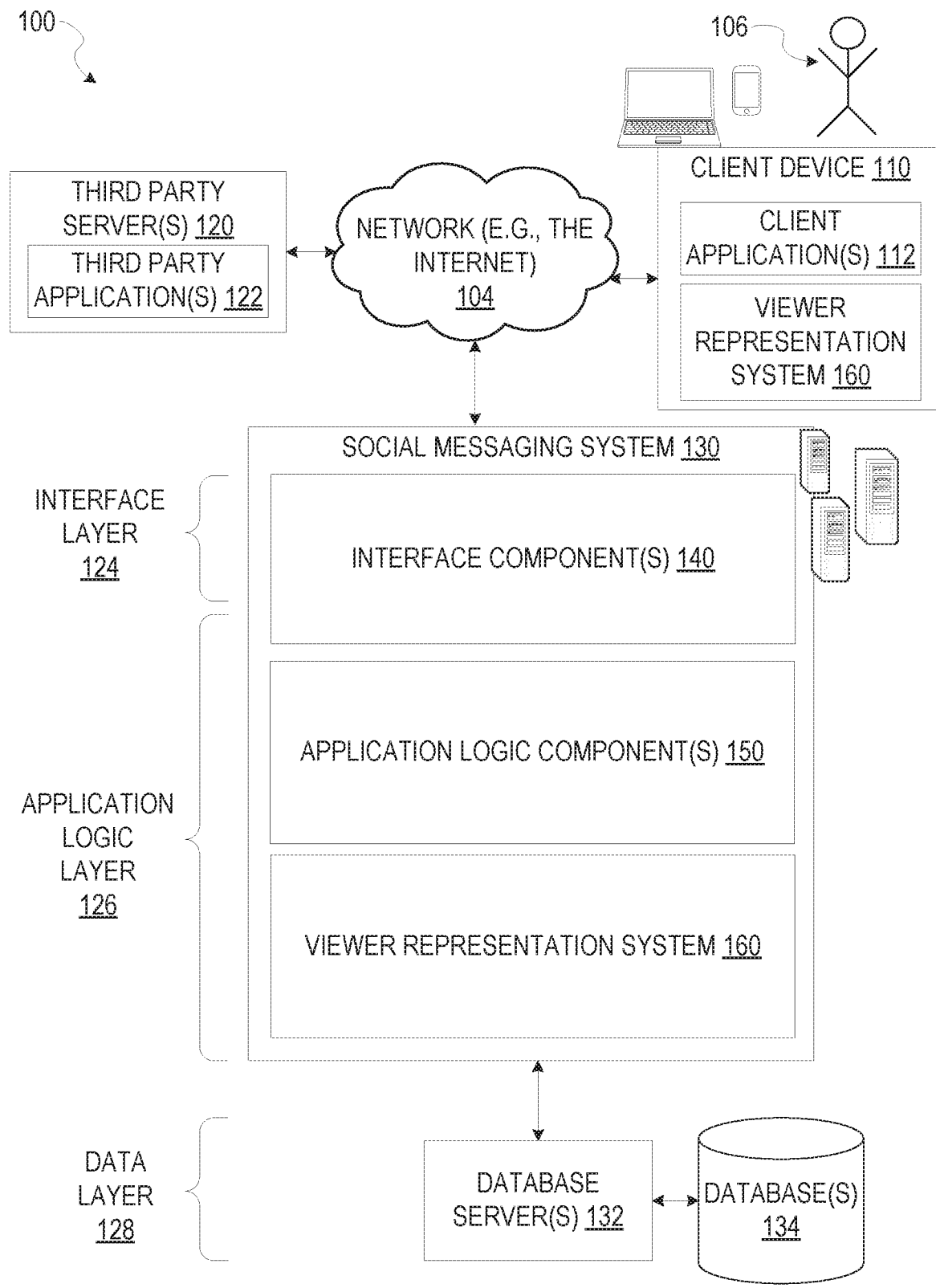
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some embodiments, a member of a social network creates content to distribute among other members of the social network. The content may include image, video, and audio data (e.g., a picture or video recording captured on a smartphone). The content may be ephemeral in nature, such that the content is automatically removed from devices of the other members and the social network after a period of time (e.g., content is removed after a 24-hour period of time), a view or any other suitable condition. When the other members of the social network view the distributed content, an application on a device (e.g., a smartphone or tablet) may notify the member who created the content. The application may display identifications, such as names, user names, or other member data (e.g., a picture or avatar representation associated with a particular member), of the other members of the social network as viewers of the content. In displaying the identifications, the application may divide the members based on their connection with the member who created the content. For example, the application may provide two lists of members who viewed the content, designating some members as friends and the remaining members as "other members." The members designated as friends may have a direct connection or link, within the social network, to the member who created the content. In some embodiments, the application also generates status icons, presented along with some of the identifications for members who viewed the content. For example, a member who is designated in the social network as a celebrity or official account and who viewed the content may be presented by the application with a status icon next to their identification. In further example embodiments, the application may rank, sort, or otherwise alter an ordering of the members based on attributes associated with the members. For example, the application may order the members who viewed the content based on a connection strength with the member who created the content (e.g., based on a count of messages exchanged), a social network activity score (e.g., a score indicating a number of messages sent and received), a recentness of communication (e.g., members that have exchanged communications within a time period)), or another suitable metric.

The above is one specific example. The various embodiments of the present disclosure relate to devices and instructions by one or more processors of a device to identify and represent content viewers to a member of a social network who created and distributed content to be viewed. A viewer representation system is described that enables a member of a social network to quickly and clearly identify members of the social network who viewed content generated by the member. The viewer representation system may enable the member to identify and distinguish friends who viewed their content from other members of the social network. In some embodiments, the viewer representation system enables the member to identify high status members of the social network who viewed their content. In some instances, the viewer representation system identifies and distinguishes identifications for members of the social network who viewed the member's content, who are not identified as friends or connections within the social network, and who are potentially an acquaintance of the member.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third party server(s) 120 executing third party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of a viewer representation system 160 such that components of the viewer representation system 160 configure the client device 110 to perform a specific set of functions with respect to operations of the viewer representation system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the viewer representation system 160 to identify, represent, and differentiate members of the social network who viewed content created by a specified member, based on interrelations of the members to the specified member and a designated status of the members.

Each client device 110 can comprise a computing device that includes at least a display and communication capabilities with the network 104 to access the social messaging system 130, other client devices, and third party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the networked system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the viewer representation system 160 capable of identifying, representing, and differentiating members of the social network who viewed content created by a specified member, based on interrelations of the members to the specified member and a designated status of the members. Similarly, the client device 110 includes at least a portion of the viewer representation system 160, as described above. In other examples, client device 110 may include the entirety of the viewer representation system 160. In instances where the client device 110 includes a portion of (or all of) the viewer representation system 160, the client device 110 can work alone or in cooperation with the social messaging system 130 to provide the functionality of the viewer representation system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the viewer representation system 160 may identify, represent, and differentiate members of the social network who viewed content created by a specified member, based on interrelations of the members to the specified member and a designated status of the members. The device may designate members to which the content is to be distributed as a part of a generation of content for an ephemeral message. Further, in response to viewing of the ephemeral message, the device may generate notifications and display identifications of members who received or viewed the ephemeral messages, according to functionality described with respect to one or more embodiments of the viewer representation system 160, described herein.

Figure 2:
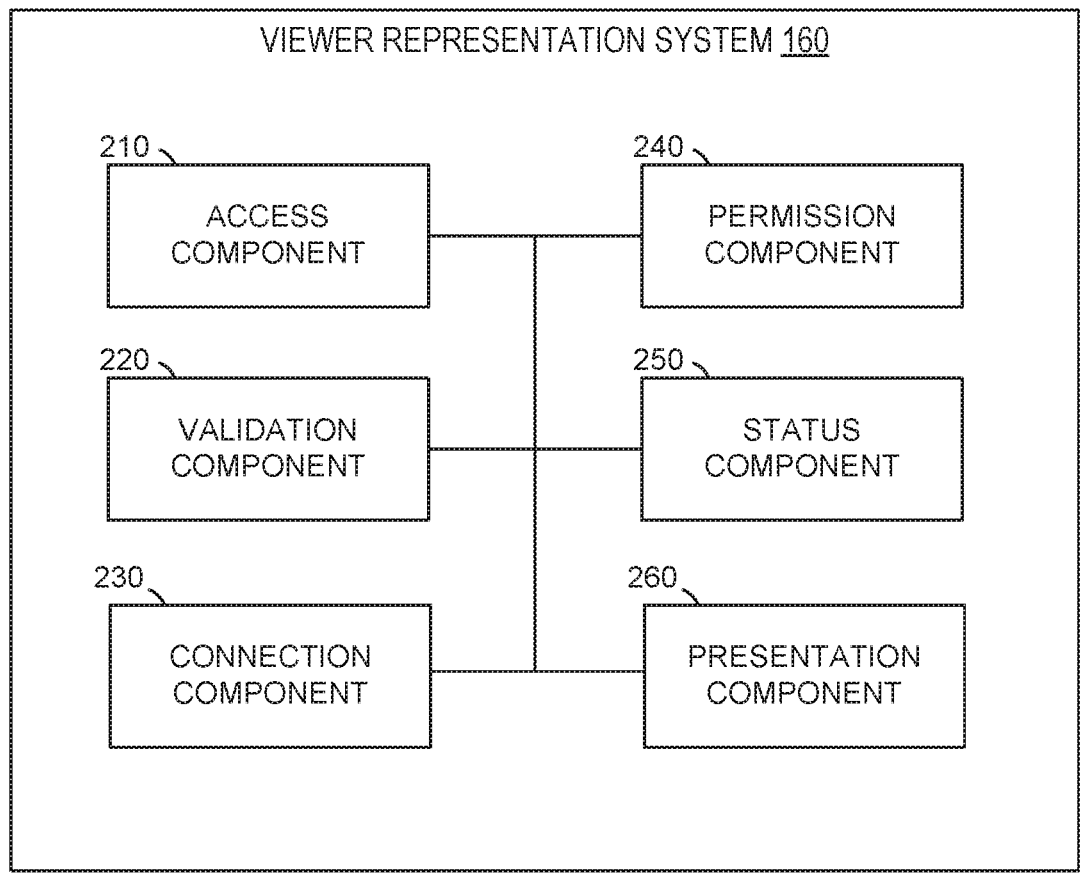
FIG. 2 is a diagram illustrating a viewer representation system, according to some example embodiments.

In FIG. 2, in various embodiments, the viewer representation system 160 can be implemented as a standalone system or implemented in conjunction with the client device 110, and is not necessarily included in the social messaging system 130. The viewer representation system 160 is shown to include an access component 210, a validation component 220, a connection component 230, a permission component 240, a status component 250, and a presentation component 260. All, or some, of the components 210-260, communicate with each other, for example, via a network coupling, shared memory, and the like. Each component of components 210-260 can be implemented as a single component, combined into other components, or further subdivided into multiple components. Other components not pertinent to example embodiments can also be included, but are not shown.

Figure 3:
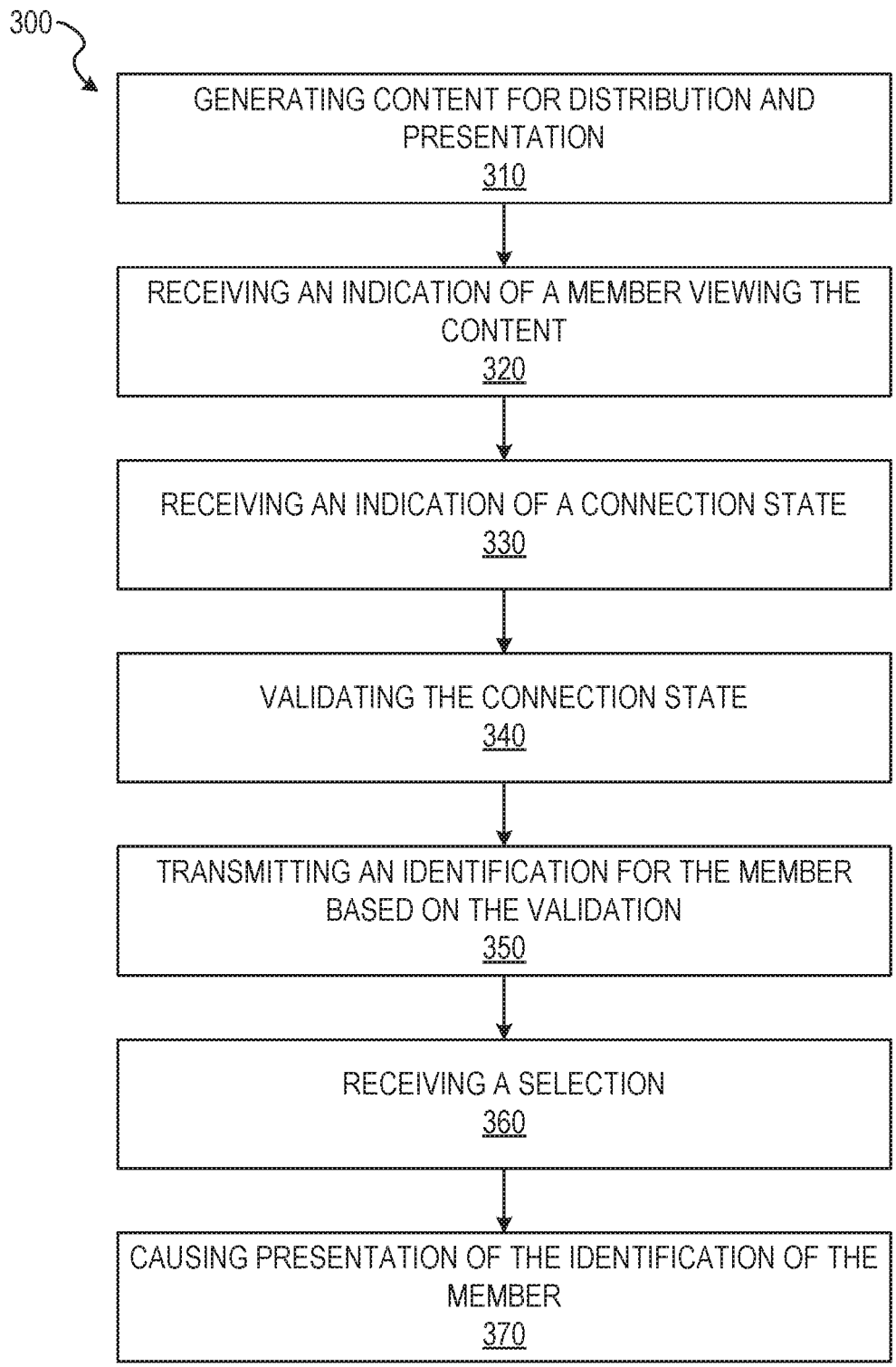
FIG. 3 is a flow diagram illustrating an example method for representing content viewers, according to some example embodiments.

FIG. 3 depicts a flow diagram illustrating an example method 300 for representing content viewers, according to some example embodiments. The operations of method 300 may be performed by components of the viewer representation system 160, and are so described below for purposes of illustration.

In operation 310, a member of the social messaging system 130 generates content for distribution and presentation to one or more other members of the social messaging system 130. In some embodiments, the member generating the content may capture image data, audio data, video data, or combinations thereof using the client device 110. The content may be generated using one or more data capture device, such as an image capture device, a microphone, or other suitable data capture devices associated with or coupled to the client device 110. In some embodiments, the content includes one or more of data captured using one or more component of the client device 110, data input by the member (e.g., drawing, text, stickers, emoji, or combinations thereof), data captured from a device (e.g., the third party server 120) accessible by the client device 110 via the network 104, combinations thereof, or any other suitable information. The content may be configured as a message, a post, an ephemeral message, or any other suitable content for distribution and viewing at a client device.

Once generated, in some instances, the content is packaged for transmission. The transmission may comprise a message including the content and a distribution setting. The distribution setting may indicate an access permission, an access permission type (e.g., "Everyone," "Public," "Friends Only," "Private," or a list of members of the social network specified by the user), a privacy setting or type, or any other suitable distribution scheme. In some embodiments, the distribution setting indicates members of the social messaging system 130 authorized to receive, access, view, or interact with the content.

In some instances, the distribution setting is binary, representing a private distribution or a public distribution. In such instances, a private distribution of content is receivable or viewable by a subset of members of the social messaging system 130. In some instances, the distribution setting may comprise a plurality of options, such that more than two distribution settings are available and represent varying degrees or reach of distribution or privacy. In some instances, a change in a distribution setting may not retroactively modify a distribution of content, but may apply to distribution of content performed after the change. In some instances, changes in distribution or privacy settings may be retroactive, at least in part. For example, a change in distribution or privacy settings may block one or more members from viewing content previously available under a previous distribution setting. The block may prevent a first view, may prevent subsequent views, or may prevent copying or other reproduction of the content. In some instances, changes in distribution or privacy settings may not affect the list of members who viewed the content.

The subset of members may comprise members of the social messaging system 130 having a connection or link to the member generating the content. For example, the subset of members may be members identified as friends, connections, or other individuals or entities directly linked to the member generating the content. In some instances, to view content with a private distribution the link between the members is a direct link, while in other embodiments, members may view the content while having an indirect link to the member generating the content. In such embodiments, the link may fall below a link threshold. For example, a link threshold may limit viewing the private distribution content to members having a second degree connection to the member generating the content. In some instances, any member of the social messaging system 130 is able to view content selected for public distribution.

In operation 320, the access component 210 receives or otherwise accesses an indication of a first member having viewed the content generated by the member of the social messaging system 130, a second member of the social messaging system 130. In some instances, the indication represents a view of the content, a message including the content, an ephemeral message including the content, or any other suitable presentation of the content. The indication may also represent an interaction with the content, such as the first member selecting, copying, or otherwise interacting with or manipulating the content within a user interface on a first client device associated with the first member.

In some embodiments, the social messaging system 130 identifies the first member as viewing or having viewed the content based on receiving the indication from the first device. In such embodiments, the social messaging system 130 receives the indication of the first member viewing the content at a time contemporaneous with the presentation of the content at the first device. In some instances, the social messaging system 130 identifies the first member as viewing or having viewed the content in response to the first client device accessing the content on a database (e.g., the database 134) associated with, coupled to, or otherwise accessible by the social messaging system 130.

In operation 330, the validation component 220 receives or determines an indication of a positive connection state for the first member viewing the content. The positive connection state represents a local link between the first member and a second member of the social messaging system 130. For example, the positive connection state may represents a local link or connection between the first member and the second member, who generated the content. In some embodiments, the indication is stored on a first device associated with the first member. For example, the positive connection state may indicate a friend relationship or direct (e.g., first degree) connection between the first and second members.

The local link may be understood as a social graph link connecting the first member and the second member. An iteration or copy of the social graph link may be stored on a client device associated with each member being a party to the social graph link. For example, the indication of the social graph link may be stored at a client device associated with the first member where the first member is associated with the second member through the social graph link. As such, a local link may indicate a connection between the members of the social messaging system 130 stored on the client device of one of the members. In some instances, the social graph link is a first iteration or instance of the social graph link. A second iteration or instance of the social graph link may be stored at the database 134 of the social messaging system 130. As will be explained in more detail below, comparison of the first iteration or instance and second iteration or instance of the social graph link may be used to validate the connection status of the first member and the second member for presenting the identification of the among a specified set of members who have viewed the content.

In some embodiments, the positive connection state of the first member is determined initially at the first device. In such embodiments, an application or browser may access a database, memory, or other data storage device coupled to, accessible by, or a part of the first client device. For example, the first device may determine the positive connection state from information stored on the first device and accessible to an application or user interface. The information used to determine the positive connection state may be locally stored connection or link data, such as a friends list, a contact list, a connection list, a set of linked members, or other suitable connection data. In some instances, the information may be stored as a table, a set of links, or any other suitable manner.

In response to determining the positive connection state of the first member, locally at the first device associated with the first member, the first device transmits or causes transmission of the indication of the positive connection state from the first device to one or more network devices, such as the social messaging system 130. The first client device may transmit the indication of the positive connection state to the social messaging system 130 via the network 104 (e.g., the internet) or any other suitable communications method.

In operation 340, the validation component 220 validates the positive connection state by identifying a server link between the first member and the second member. The validation component 220 may compare the positive connection state, or the underlying local link, with the server link. Where the positive connection state or local link (e.g., an edge between two nodes representing members of the social messaging system 130) and the server link match, the validation component 220 may validate the positive connection state.

The server link may indicate a connection between the members stored on a database or memory of the social messaging system 130. Validation of the local link with the server link indicates that the members are connected or otherwise linked. In some instances, validation of the local link with a matching server link may prevent unauthorized viewing of the content by a member not connected or linked to the member generating the content. In some embodiments, the server link is stored or represented by an indicator (e.g., a link or connection indicator) stored in the member profile of one or more of the first member and the second member or in metadata associated with the member profiles.

In operation 350, in response to validating the positive connection state, the access component 210 transmits an identification of the first member to a second client device (e.g., the client device 110) of the second member responsible for generating the content. The identification may be transmitted as a name, a user name, an icon, an avatar, or any other suitable representation of the first member to the second client device. In some instances, the identification is transmitted as soon as the first member views the content and the positive connection state is validated, such that the second member receives real-time or near real-time viewing indications. The identification may also be transmitted in a batch form, such that the access component 210 transmits identifications at regular intervals or once a threshold number of members have viewed the content.

In operation 360, the social messaging system 130, the second client device, or an application operating on the second client device receives a selection at a user interface. In some embodiments, the selection represents interaction with a notification indicating the identification of the first member. In some instances, the selection represents interaction with the application to access a list or presentation of members having viewed content generated by the second member. The selection may trigger opening of an application associated with the social messaging system 130. The selection may be within an application of the social messaging system 130 and trigger opening or populating a list of members of the social messaging system 130 who viewed the content or content element generated by the second member.

In operation 370, the presentation component 260, operating on one or more of the social messaging system 130 and the second client device, causes presentation of the identification of the first member. Presentation of the identification may be performed in response to receiving the selection from the second device. The identification may be presented on the user interface being presented on the second device. In some embodiments, the identification for the first member is presented in a first portion of the user interface associated with one or more identifications of members of the social messaging system 130 having a link with the second member.

Figure 4:
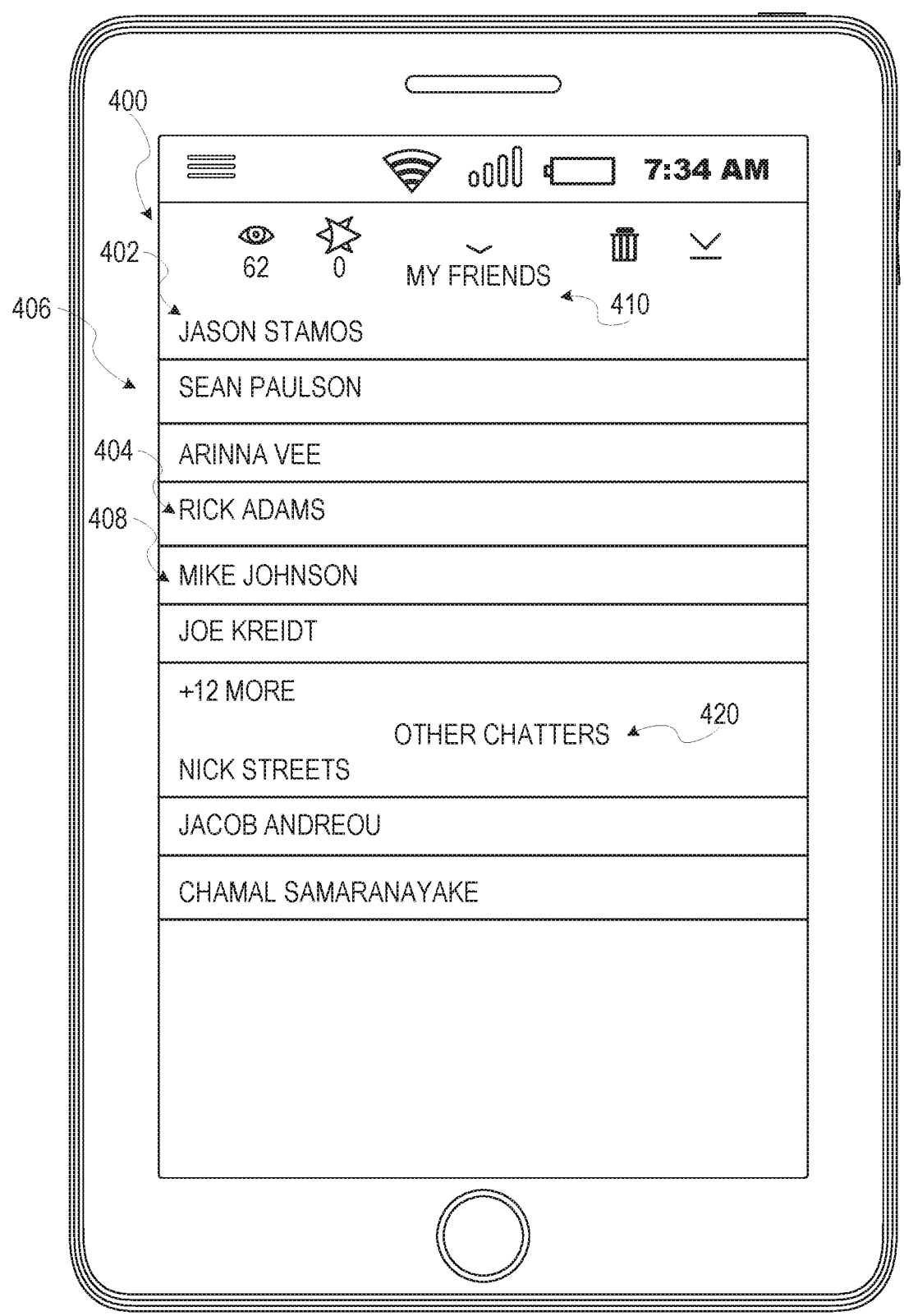
FIG. 4 is a user interface diagram depicting representation of a plurality of content viewers, according to some example embodiments.
Figure 5:
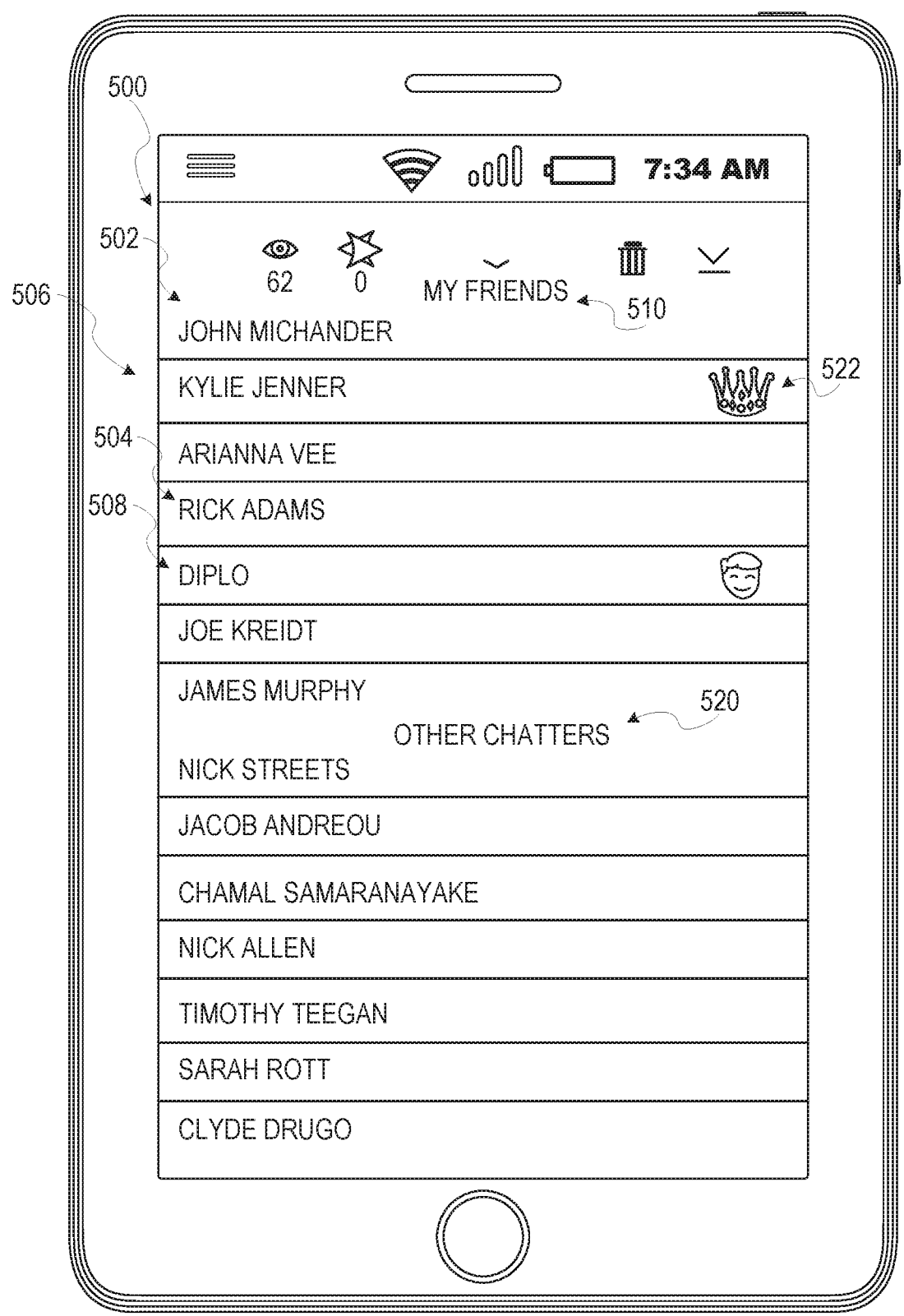
FIG. 5 is a user interface diagram depicting representation of a plurality of content viewers, according to some example embodiments

In some embodiments, as shown in FIGS. 4 and 5, an identification 402 or 502 of a first member 404 or 504 is in a first portion 406 or 506 of a user interface 400 or 500 associated with one or more identifications of members of the social messaging system 130. The first portion 406 or 506 of the user interface 400 or 500 may be designated for members having a link or connection with the second member. Presentation of the identification 402 or 502 in the first portion 406 or 506 may comprise displaying a name 408 or 508 or identification of the first member 404 or 504 and other similarly situated members who viewed the content, an indication of an official nature or status of the member or account, a connection level between the viewing member and the second member, a distribution setting (e.g., public or private) of the content, and a user identification, where the member account is official.

In some instances, presentation includes display of friend accounts above accounts for members who are not friends with the second member and a privacy flag or distribution setting flag 410 or 510 (e.g., everyone, friend, or custom). Where an official account views the content, the official account's member or owner identification may be stored with an official story owner data store entity. In instances where two or more contributors operate the second member account, content generated and distributed by each of the two or more contributors are associated with lists of viewers similar to the one described above, such that content from any contributor or collaborator reflects an individual's friend list or a member account friend list.

Figure 6:
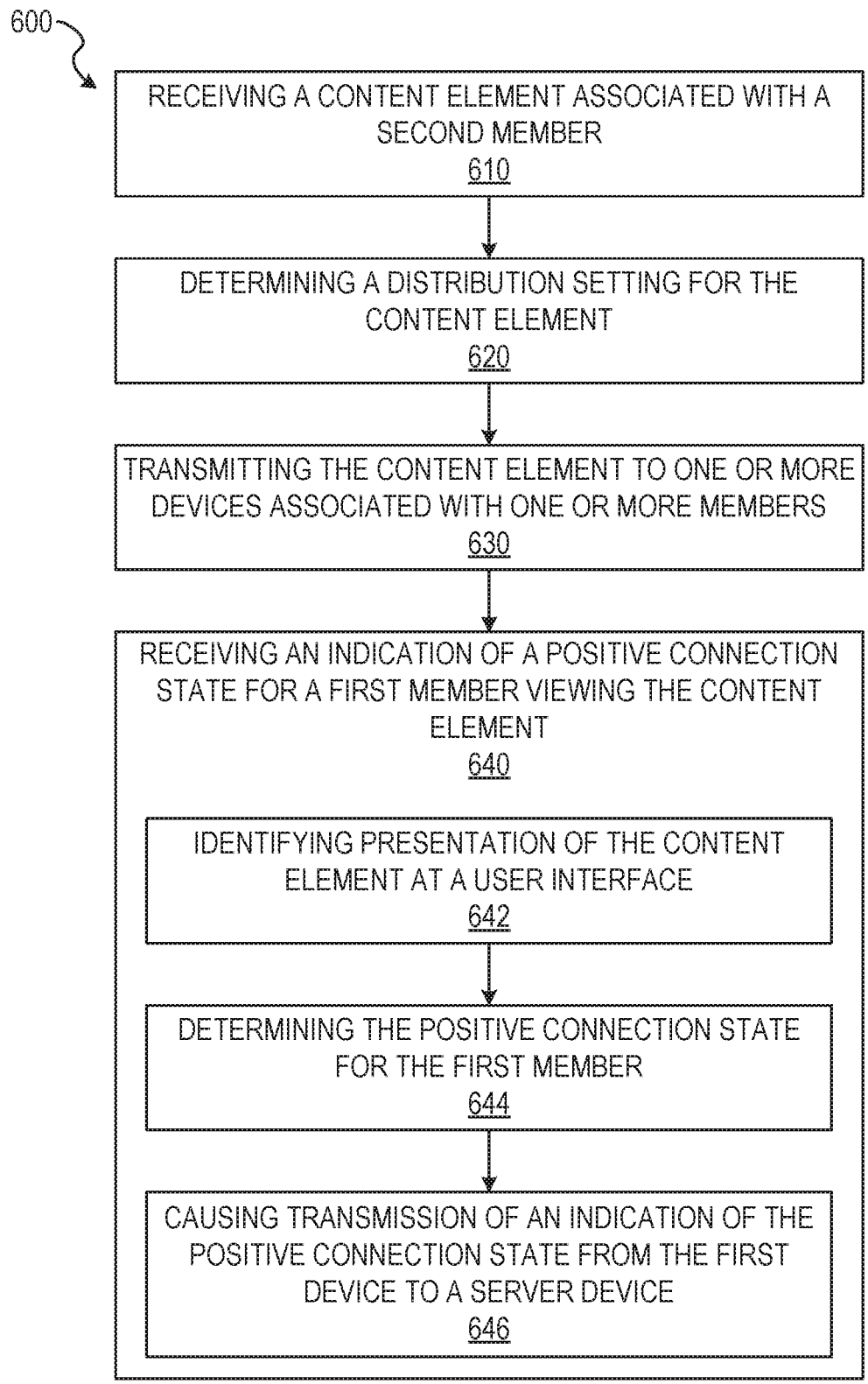
FIG. 6 is a flow diagram illustrating an example method for representing content viewers, according to some example embodiments.

FIG. 6 shows a flow diagram illustrating an example method 600 for representing content viewers, according to some example embodiments. The operations of method 600 may be performed by components of the viewer representation system 160. In some instances, certain operations of the method 600 may be performed using one or more operations of the method 300 or as sub-operations of one or more operations of the method 300, as will be explained in more detail below. For example, the method 600 may be performed as part of the method 300.

In operation 610, the access component 210 receives or accesses a content element associated with a second member. In some embodiments, the access component 210 receives the content element of the second member prior to receiving the indication of the positive connection state for the first member and the second member. For example, in some embodiments, once the content is generated at the client device 110 (e.g., operation 310), the social messaging system 130 receives the content. The content may be transmitted to the social messaging system 130 via one or more communication components or devices coupled to, in communication with, or a part of the client device 110. In such embodiments, one or more processors of the social messaging system 130, the database server 132, or a machine interacting the social messaging system 130 receives the content element associated with the member. Although described as being transmitted to the social messaging system 130, in some instances, the content is transmitted directly to a client device of one or more members of the social messaging system 130 via the network 104, from the client device 110.

In operation 620, the permission component 240 determines a distribution setting for the content element. The distribution setting may be selected by the second member, automatically selected based on a type of content element, automatically selected by a default setting, or selected in any other suitable manner at the time of creating the content element. In some embodiments, the distribution setting indicates at least one access permission type for the content element. Upon receiving the content in operation 610, the social messaging system 130 may determine the distribution setting for the content or a content element.

In operation 630, the access component 210 transmits the content element to one or more devices associated with one or more members of the social messaging system 130. The content element may be transmitted to the one or more devices prior to operation 320, at which it is determined that the first member has viewed the content element. In some embodiments transmission of the content element is triggered in response to receiving the content element and the distribution setting. In embodiments where the access component 210 receives the content element of the second member prior to receiving the indication of the positive connection state of the first member and the second member, the access component 210 may transmit the content element to the first device associated with the first member. Transmission of the content element to the one or more devices may be performed in response to determining the distribution setting, the social messaging system 130 or a device or component associated with or in communication with the social messaging system 130 transmits the content element to one or more client devices. The one or more client devices may be associated with one or more members of the social messaging system 130. The one or more members (e.g., associated client devices) receiving the content correspond to the distribution setting. In some embodiments, the one or more members correspond to the distribution setting based on a connection or link to the member generating the content.

Although described as transmitting the content, in some embodiments, the social messaging system 130 transmits an indication of viewable content to the one or more devices of the one or more members suitable for receiving or viewing the content based on the distribution setting. In such embodiments, the one or more client devices receive the indication and cause presentation of the indication at a user interface. The indication may be presented as a selectable user interface element configured to direct a browser or application to a network address of the content, poll or request the content from the social messaging system 130, or perform any other suitable operation or set of operations to initiate presentation of the content. In some embodiments, the social messaging system 130 stores and configures the content for presentation at the one or more client devices without transmitting an indication. In such embodiments, upon login or accessing of the social messaging system 130, a browser or application on a client device may request or otherwise identify new (e.g., unviewed) content, and retrieve the content, or a portion thereof, for presentation at the client device.

In operation 640, the validation component 220 receives or determines an indication of a positive connection state for the first member viewing the content. The indication of the positive connection state may be determined at the first client device, as described above with respect to the method 300. The positive connection state may be determined using information available locally at the first client device and transmitted to the validation component 220 via the access component 210 and a network connection extending between the first client device and the viewer representation system 160.

In operation 642, the validation component 220 identifies presentation of the content element at a user interface presented on the first device. In some embodiments, the content element is associated with the second member of the social messaging system 130. The validation component 220 may identify the presentation of the content element based on a notification received from the first device, when the content element is presented on a graphical user interface. The validation component 220 may also identify presentation based on a transmission of the content element to the first device. In some embodiments, selection or tapping of an icon associated with the content element, received through the user interface on the first device, may cause the first device to generate and transmit a notification of presentation to the viewer representation system 160.

In operation 644, the validation component 220 determines the positive connection state for the first member. In some embodiments, the positive connection state is determined from information stored on the first device and accessible to the user interface. The validation component 220, or a portion thereof operating on the first device, may determine the positive connection state using information stored on the first device, as described above with respect to the method 300.

In operation 646, the access component 210 causes transmission of the indication of the positive connection state from the first device to the server device. In some embodiments, the indication of the positive connection state is transmitted in response to determining the positive connection state in operation 644. The access component 210, or a portion thereof operating on the first device, may transmit the indication to the viewer representation system 160. In some instances, the access component 210 causes the first device to transmit the indication upon notification of the viewing of or interaction with the content element at the first device and a determination at the first device of the positive connection state.

In some instances, a member viewing the content may be determined to have a connection status other than a positive connection status with the second member responsible for generating and distributing the content. In such instances, a method may proceed similarly to the methods 300 or 600, as described in more detail below. Similar to the manner described above, a member (e.g., the second member) of the social messaging system 130 generates content, sets a distribution setting, and causes transmission of the content to one or more of the social messaging system 130 or one or more client devices associated with members of the social messaging system 130. Similar to the manner described above, the social messaging system 130 may receive an indication of a member (e.g., a third member) of the social messaging system 130 viewing or having viewed the content generated by the second member.

Figure 7:
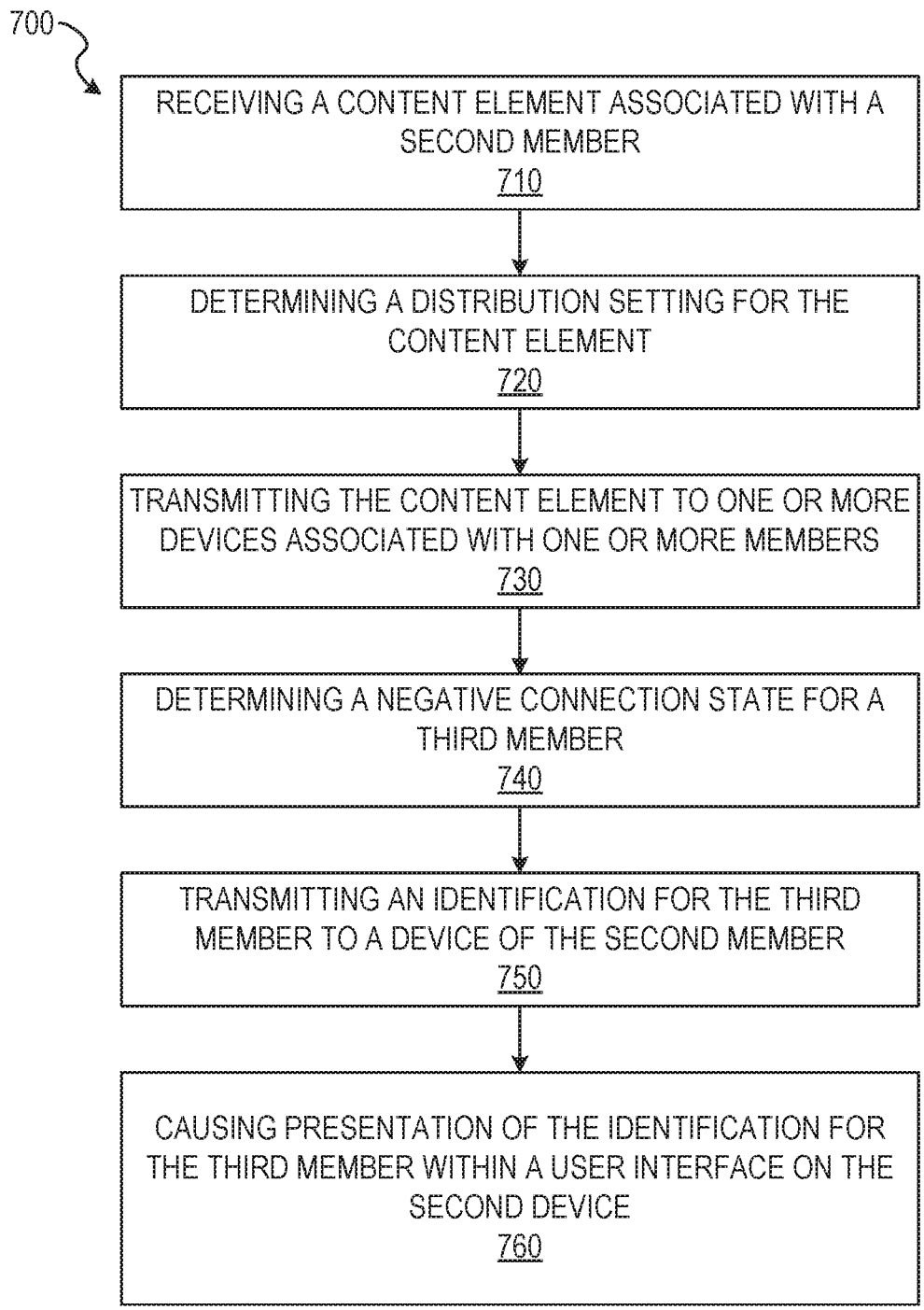
FIG. 7 is a flow diagram illustrating an example method for representing content viewers, according to some example embodiments.

FIG. 7 shows a flow diagram illustrating an example method 700 for representing content viewers, according to some example embodiments. The operations of method 700 may be performed by components of the viewer representation system 160. In some instances, certain operations of the method 700 may be performed using one or more operations of the methods 300 or 600 or as sub-operations of one or more operations of the methods 300 or 600, as will be explained in more detail below. For example, the method 700 may be performed as part of the method 300.

In operation 710, the access component 210 receives or accesses a content element associated with a second member. The access component 210 may receive the content element of the second member prior to receiving the indication of a positive connection state. Once the content is generated at the client device 110 (e.g., operation 310), the social messaging system 130 receives the content. The content may be transmitted to the social messaging system 130 via one or more communication components or devices coupled to, in communication with, or a part of the client device 110. In some embodiments, operation 710 may be performed similarly or the same as described above with respect to operation 610.

In operation 720, the permission component 240 determines a distribution setting for the content element. In some embodiments, the distribution setting indicates at least one access permission type for the content element. Upon receiving the content in operation 610, the social messaging system 130 may determine the distribution setting for the content or a content element. In some embodiments, operation 720 may be performed similarly to or the same as described above with respect to operation 620.

In operation 730, the access component 210 transmits the content element to one or more devices associated with one or more members of the social messaging system 130. The content element may be transmitted to the one or more devices prior to operation 320, at which it is determined that the first member has viewed the content element. In some embodiments transmission of the content element is triggered in response to receiving the content element and the distribution setting. In some embodiments, the content element may be transmitted to a third member, distinct from the first member and the second member described above.

In operation 740, determine a negative connection state for the third member. In some embodiments, in response to receiving an indication of the third member viewing or having viewed the content, the social messaging system 130 attempts to validate or identify a connection status existing between the third member and the second member. In some instances, the social messaging system 130 determines a negative connection state for the third member, with respect to the second member. The negative connection state may be determined using information stored on the server device of the viewer representation system 160. The negative connection state may be determined using information stored on the second client device, of the second member, or the third client device, of the third member.

The negative connection state may represent an absence of a link between the second member and the third member. The negative connection state may represent an attenuated connection between the third member and the second member, such that the connection or link exceeds a link threshold between the third member and the second member. For example, where the third member is connected to the second member by two or more links and two or more intervening members, the connection may exceed the link threshold and be determined to be too attenuated to qualify the third member as a direct connection (e.g., a friend) of the second member.

In some embodiments, the negative connection state is determined using one or more sub-operations. The validation component 220 may identify presentation of the content element at the user interface presented on the third device. For example, in response to receiving the content element and a selection within the user interface, the third device may transmit a presentation notification to the validation component 220 or the access component 210. The presentation notification may represent viewing of a content element, interaction with a content element, or any other suitable action on or relating to the content element triggered by presentation of the content element at the third device.

The validation component 220 may determine a positive connection state for the third member. In such instances, a portion of the validation component 220, stored on or operating on the third client device, may determine the positive connection using information stored only on the third client device. In some embodiments, the positive connection state represents a local link between the third member and the second member. The positive connection state may be determined from or stored in information stored on the third client device and accessible to the user interface. For example, the positive connection state may be determined from a member table or metadata on the third client device indicating connections, logged by the third client device, between the third member and other members of the social messaging system 130. In response to determining the positive connection state, the third client device or the access component 210, upon receiving an indication of a connection state determined at the third client device, may cause transmission of the indication of the positive connection state from the third device to the server device. Transmission of the indication of the connection state may trigger a secondary validation or confirmation of the local link data stored on the third client device.

In some embodiments, the access component 210 receives the indication of the positive connection state for the third member, determined using information stored on the third client device associated with the third member. In response to receiving the indication of the positive connection state, the validation component 220, operating on the server device of the viewer representation system 160, determines the local link represented by the positive connection state of the third member is mismatched with a server link between the third member and the second member. The mismatch of the validation attempt may fail based on a lack of response of an indication of a connection state, the local link not matching the server link, or the local link being determined to be fraudulent. In instances, of a lack of response of an indication of a connection state, the viewer representation system 160 may identify a version of an application operating on the client device, determine the version does not support transmission of the indication of the connection state, and use only the connection state indicated on the social messaging system 130.

A mismatch may also occur where connection information on the third client device and on the server device are not synchronized or where an update to the connection information has been transmitted to the server device (e.g., the second member terminates the connection to the third member) but has not yet propagated to the third client device. The server link may indicate an absence of a connection between the third member and the second member. In such instances, the server link represents a higher priority or trust and the validation component designates the connection state as a negative connection state, thereby overwriting the positive connection state.

In operation 750, the access component 210 transmits an identification for the third member to the second client device associated with the second user. The identification of the third member may be transmitted to the second client device in response to determining the negative connection state in operation 740. In some embodiments, operation 750 may be performed in a manner similar to or the same as described above with respect to operation 350.

In operation 760, the presentation component 260 causes presentation of the identification for the third member within the user interface on the second device. The identification for the third member may be presented in a second portion of the user interface associated with one or more identifications of members of the social messaging system 130 lacking a link with the second member. As shown in FIGS. 4 and 5, a second portion 420 or 520 of the user interface may be presented below the first portion 406 or 506 of the user interface 400 or 500.

In some embodiments, upon receiving the transmission of the identification for the third member, one or more of the social messaging system 130 and the second client device causes presentation of the identification of the third member. In some embodiments, presentation of the identification for the third member may be performed similarly to the manner described above with respect to operations 360 and 370. The identification for the third member may be presented within the user interface on the second client device. The identification for the third member may be presented in a second portion of the user interface associated with one or more identifications of members, of the social messaging system 130, lacking a link, or a suitable link, with the second member.

The viewer representation system 160, or components thereof, may identify a set of members associated with the set of identifications presented in the second portion of the user interface. As described above and shown in FIG. 4, the second portion 420 of the user interface may be designated for "other members" who are not determined to be friends or other suitable connections of the second member. The viewer representation system 160 may perform a link analysis for each member of the set of members to be presented in the second portion 420 of the user interface.

The link analysis may determine one or more of an attenuation of links between the set of members and the second member, a set of tie strengths between the set of members and the second member, a number of common members connected to both the second member and the third member, or any other characteristic of relationships, social networks, social webs, connections, links, or commonalities between the set of members and the second member. The link analysis is described in more detail below.

Figure 8:
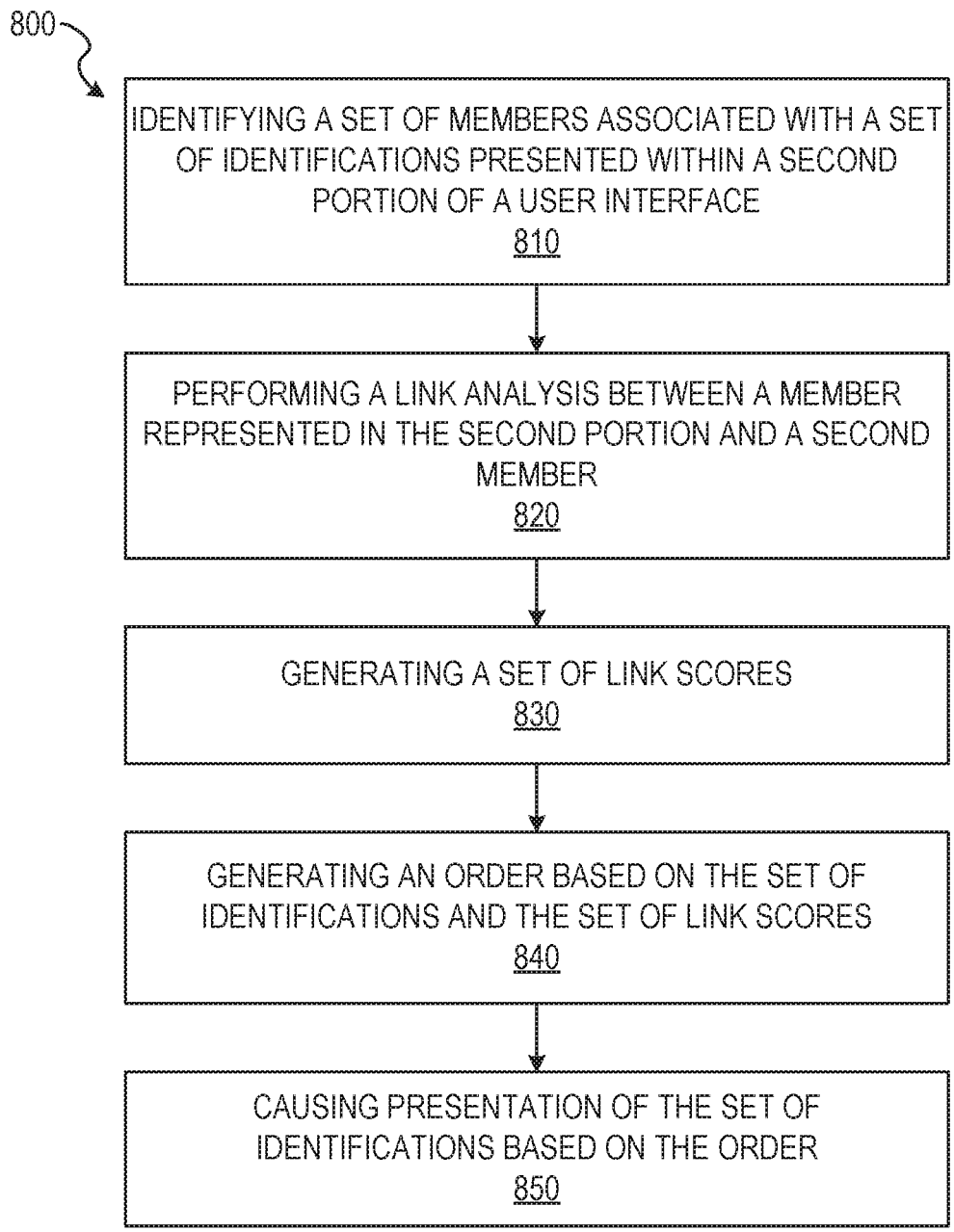
FIG. 8 is a flow diagram illustrating an example method for representing content viewers, according to some example embodiments.

FIG. 8 shows a flow diagram illustrating an example method 800 for representing content viewers, according to some example embodiments. The operations of method 800 may be performed by components of the viewer representation system 160. In some instances, certain operations of the method 800 may be performed using one or more operations of the methods 300, 600, or 700 or as sub-operations of one or more operations of the methods 300, 600, or 700, as will be explained in more detail below. For example, the method 800 may be performed as part of the method 700.

In operation 810, the presentation component 260 identifies a set of members associated with a set of identifications presented within the second portion of the user interface. In some embodiments, the second portion of the interface is associated with negative connection states between members, as determined in the method 700. The first portion of the interface may be associated with positive connection states between members as described above in methods 300 and 600.

In operation 820, the presentation component 260 performs a link analysis between a member represented in the second portion of the user interface and the second member. In some embodiments, the presentation component 260 performs a link analysis for each member of the set of members to be presented in the second portion of the user interface. The link analysis may identify direct connections, attenuated connections (e.g., friends of friends), timeliness of connections (e.g., oldest connections vs. newer connections), shared interactions between members (e.g., members sharing content between each other or members viewing, generating, or sharing similar content), or any other suitable link information indicating similarities, differences, or connections between any two given members. The link analysis may identify strength of connections between members, common interests between members, or any other suitable metric by which to stratify an estimated importance of a view by the first member of content generated by the second member.

In some embodiments, the link analysis includes a status analysis for members presented within the second portion of the user interface. In such embodiments, the status component 250 identifies a member status for each member of the set of members associated with the set of identities presented within the second portion of the user interface. The status component 250 identifies one or more members having a status exceeding a status threshold. In response to a member exceeding a status threshold, the presentation component 260 generates a status icon for each member of the one or more members. The status icon indicates a member status exceeding the status threshold.

The status threshold may comprise a number of followers, a number of connections, an official status, a social status, an economic status, a celebrity status, or any other suitable status. The status of the members may be gained, designated, or otherwise suitably assigned to the member profile associated with the member. In some instances, the status threshold is a threshold value. A status above the threshold value may indicate a reach, an influence level, a celebrity level, or an official nature of the member or the member profile. A content view of a member with a status, exceeding the threshold value, may be of special interest to the second member. For example, the second member may be interested to know when a celebrity or an official member profile of an entity views their content. In some embodiments, the status threshold may be modified by the second member, or automatically by the viewer representation system 160, to reflect members of interest, characteristics of interest, similarities, interests, hobbies, goals, or other suitable elements which are or appear to be important to the second member.

In some instances, the status icon may represent a manner or degree in which the member status of a specified member exceeds the status threshold. For example, a first status icon may be assigned to celebrity members, a second status icon (e.g., an icon different in appearance or character from the first status icon) may be assigned to official or entity members, and a third status icon (e.g., an icon different in appearance or character from the first and second status icons) may be assigned to a member who is neither official nor a celebrity, but has a member status otherwise exceeding the status threshold (e.g., a number of connections greater than a threshold value). Although described with respect to three status icons, it should be understood that the viewer representation system 160 may generate any suitable status icon or number of status icons or select any number of status icons form a predetermined set of status icons, suitable to indicate the member status of the one or more members.

In operation 830, the presentation component 260 generates a set of link scores. In some embodiments, the set of link scores are generated based on the link analysis performed in operation 820. Each link score may represent a distance between a member of the set of members and the second member. In some instances, each link score represents a distance or similarity between a member of the set of members and the second member.

In operation 840, the presentation component 260 generates an order based on the set of identifications based on the set of link scores. In some embodiments, the specified order may be based on, or take into consideration, a friend status (e.g., designated best friends), tie strength between members, a number of common member connections, or any other suitable characteristic. Varying strengths or variations in strength or value of direct connections may be separated or otherwise designated within the first portion of the user interface or may be ignored, depending on the embodiment of the viewer representation system 160. In some embodiments, one or more aspects of the specified order may be modified based on the distribution setting for the content. For example, where the distribution setting is designated as private, intended for direct connections only, the specified order may take connection characteristics into account in generating and presenting the identifications. In some examples or embodiments, where the distribution setting is designated as public, the first portion of the user interface may present identifications in a reverse chronological order, while identifications in a second portion of the user interface may be ordered differently.

In some embodiments, the identification may be presented within the first portion of the user interface according to a specified order. The specified order for such presentation may be chronological, such as an order presenting identifications in a reverse chronological order based on a time of viewing. In some instances, the specified order is based on one or more characteristics of the members of the social messaging system 130 who viewed the content, as described in some embodiments herein. In some instances, taking link analysis into consideration (e.g., a tie strength or a number of common connections) may place a third member, with a negative connection status, higher in the order than other non-connected members and encourage the second member to connect to the third member directly.

In operation 850, the presentation component 260 causes presentation of the set of identifications based on order. The presentation component 260 may cause presentation of the set of identifications in a manner similar to or the same as described above with respect to operations 370 or 760, and as shown in FIGS. 4 and 5. In embodiments where one or more member within the second portion of the user interface are associated with a member status exceeding the status threshold, the presentation component 260 causes presentation of the status icon proximate to an identification associated with each member, of the one or more member, whose member status exceeds the status threshold.

In some instances, the status icon for a specified member may be presented proximate to the identification for that member. For example, as shown in FIG. 5, a status icon 522 may be placed to a right side of the identification. In some embodiments, in presenting the identifications for the set of members in the second portion 520 of the user interface, the viewer representation system 160 generates a modified order based on identification of the one or more members having the member status exceeding the status threshold. The viewer representation system 160 may then cause presentation of the identifications of the set of members in the second portion of the user interface according to the modified order.

In some embodiments, where one or more member is associated with a member status exceeding the status threshold, the presentation component 260 generates a modified order based on identification of the one or more members having the member status exceeding the status threshold. The modified order may be generated from the order, of operation 840, which was generated based on the set of link scores. In some embodiments, the modified order incorporates the member status of the one or more members. The modified order may incorporate the member status as a weighted element in determining the modified order. In some instances, the modified order ranks the member status of the one or more members and places the ranked one or more members at a top of the remaining members of the set of member, such that the modified order includes a ranked list of the members having a member status and the remaining members in the order, as previously determined. The modified order may also incorporate a temporal or chronological component, such that the modified order may be based on any one or more of the link score, the member status, and the time at which a member viewed the content. The temporal or chronological component may be a forward or reverse chronological ordering element, or any other suitable time based element or weighted element. Once the modified order is generated, the presentation component 260 causes presentation of the set of identifications based on the modified order.

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Figure 9:
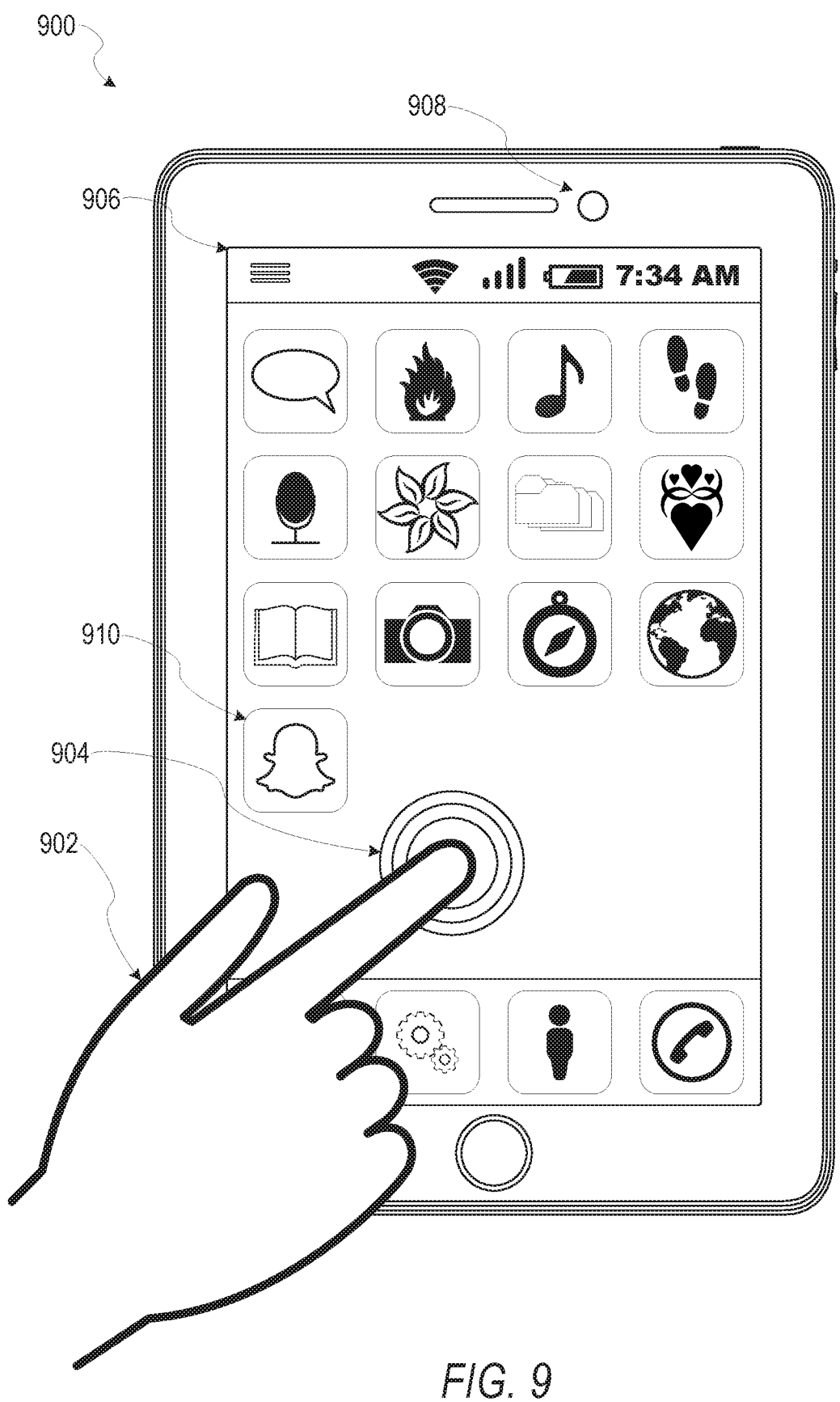
FIG. 9 is a user interface diagram depicting an example mobile device and mobile operating system interface, according to some example embodiments.

FIG. 9 illustrates an example mobile device 900 executing a mobile operating system (e.g., IOS™, ANDROID™, WINDOWS® Phone, or other mobile operating systems), consistent with some embodiments. In one embodiment, the mobile device 900 includes a touch screen operable to receive tactile data from a user 902. For instance, the user 902 may physically touch 904 the mobile device 900, and in response to the touch 904, the mobile device 900 may determine tactile data such as touch location, touch force, or gesture motion. In various example embodiments, the mobile device 900 displays a home screen 906 (e.g., Springboard on IOS™) operable to launch applications or otherwise manage various aspects of the mobile device 900. In some example embodiments, the home screen 906 provides status information such as battery life, connectivity, or other hardware statuses. The user 902 can activate user interface elements by touching an area occupied by a respective user interface element. In this manner, the user 902 interacts with the applications of the mobile device 900. For example, touching the area occupied by a particular icon included in the home screen 906 causes launching of an application corresponding to the particular icon.

The mobile device 900, as shown in FIG. 9, includes an imaging device 908. The imaging device 908 may be a camera or any other device coupled to the mobile device 900 capable of capturing a video stream or one or more successive images. The imaging device 908 may be triggered by the viewer representation system 160 or a selectable user interface element to initiate capture of a video stream or succession of images and pass the video stream or succession of images to the viewer representation system 160 for processing according to the one or more methods described in the present disclosure.

Many varieties of applications (also referred to as "apps") can be executing on the mobile device 900, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 900 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 900 includes a social messaging app 910 that, consistent with some embodiments, allows users to exchange ephemeral messages that include media content. In this example, the social messaging app 910 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the viewer representation system 160 may receive or generate content for distribution as an ephemeral message, and transmit the ephemeral message to another device using the ephemeral message system.

Figure 10:
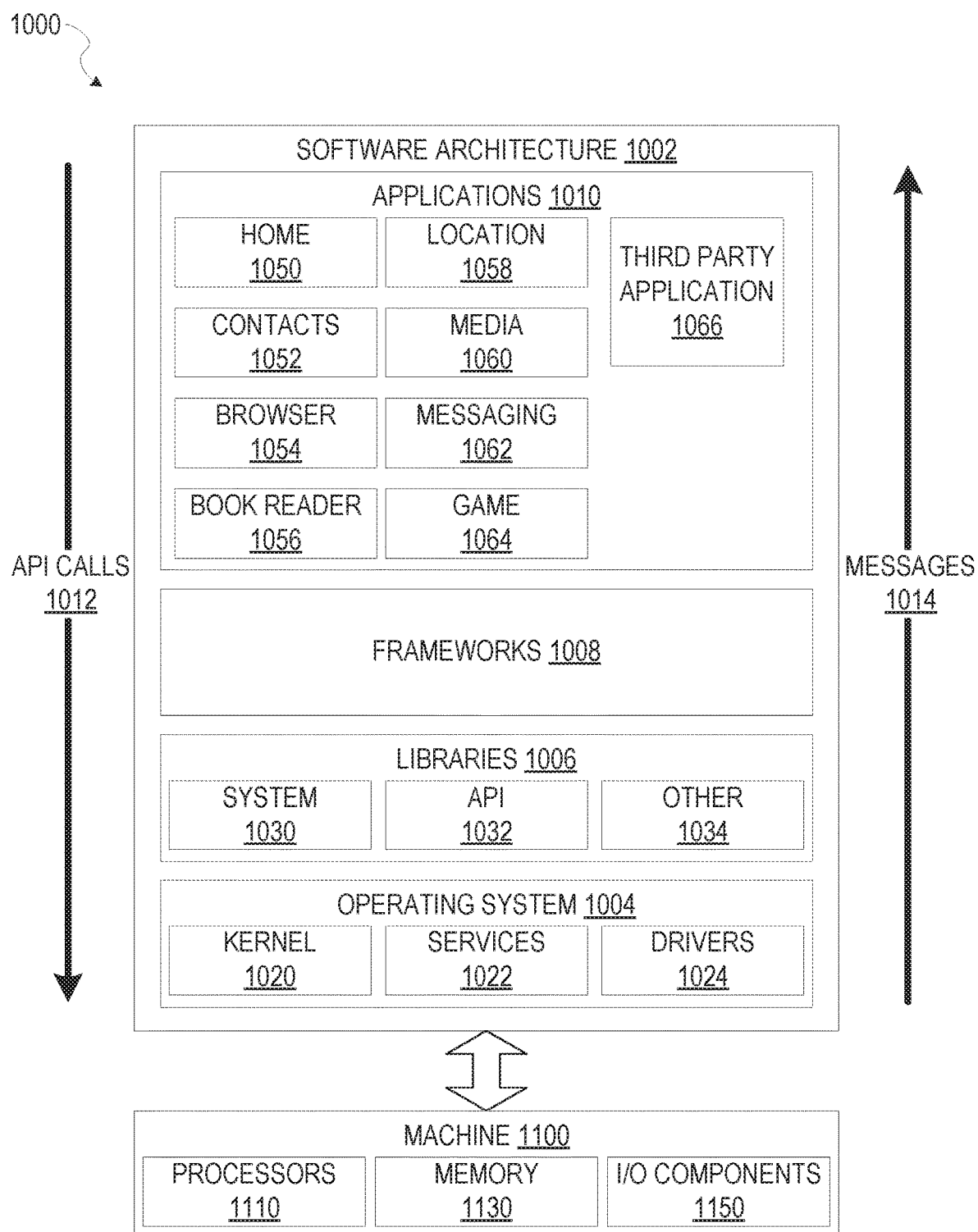
FIG. 10 is a block diagram illustrating an example of a software architecture that may be installed on a machine, according to some example embodiments.

FIG. 10 is a block diagram 1000 illustrating an architecture of software 1002, which can be installed on the devices described above. FIG. 10 is merely a non-limiting example of a software architecture, and it will be appreciated that many other architectures can be implemented to facilitate the functionality described herein. In various embodiments, the software 1002 is implemented by hardware such as machine a 1100 of FIG. 11 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third party application 1066. According to some embodiments, the applications 1010 are programs that execute functions defined in the programs. Various programming languages can be employed to create the applications 1010, structured in a variety of manners, such as object-oriented programming languages (e.g., Objective-C, Java, or C++) or procedural programming languages (e.g., C or assembly language). In a specific example, the third party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1066 can invoke the API calls 1012 provided by the operating system 1004 to facilitate functionality described herein.

Figure 11:
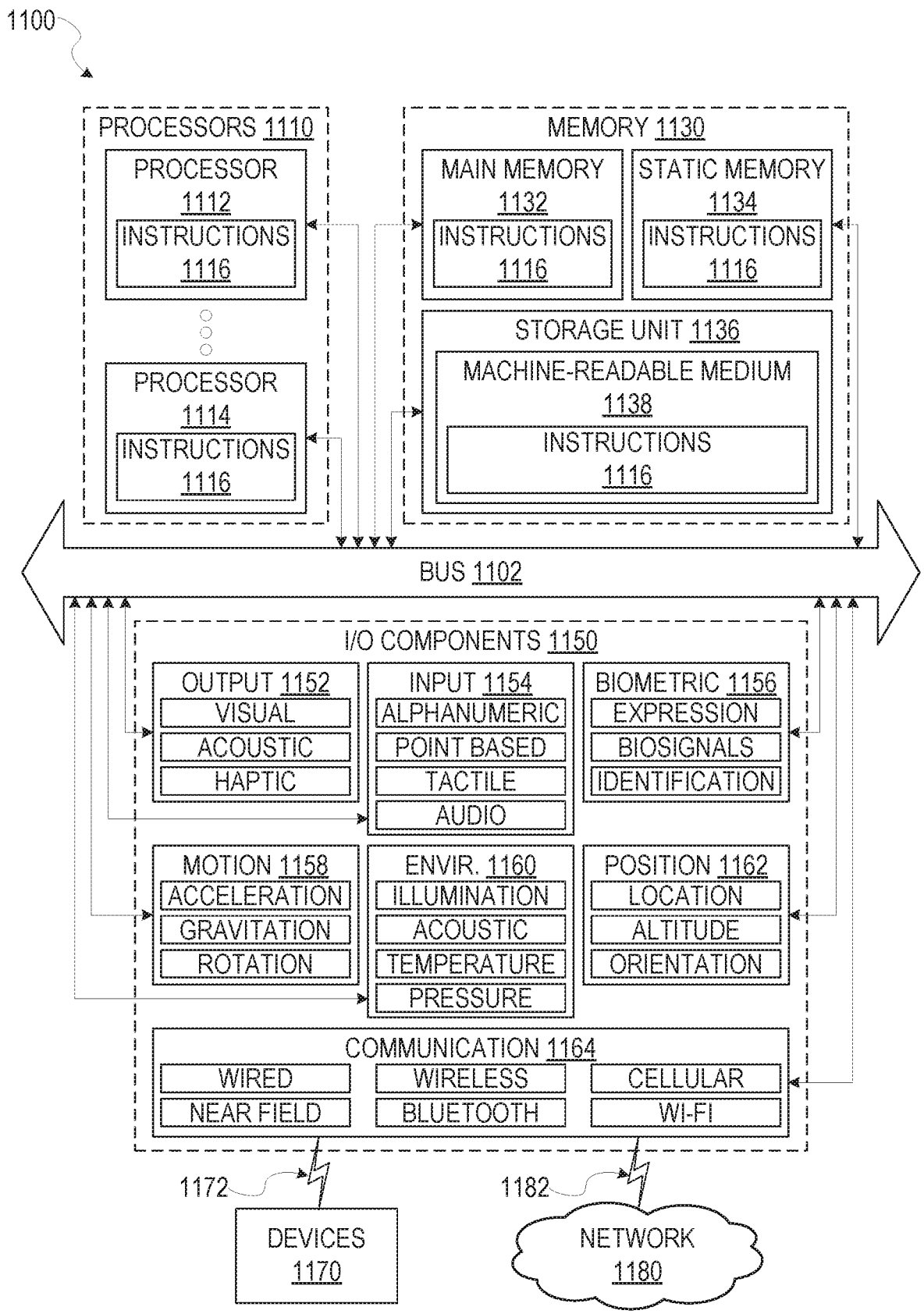
FIG. 11 is a block diagram presenting a diagrammatic representation of a machine in the form of a computer system within which a set of instructions may be executed for causing the machine to perform any of the methodologies discussed herein, according to an example embodiment.

FIG. 11 is a block diagram illustrating components of a machine 1100, according to some embodiments, able to read instructions (e.g., processor executable instructions) from a machine-readable medium (e.g., a non-transitory machine-readable storage medium) and perform any of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by processors of the machine 1100 (e.g., processors 1110), cause the machine 1100 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

In various example embodiments, portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium should be considered as being transportable from one physical location to another. Additionally, since the machine-readable medium 1138 is tangible, the medium may be considered to be a machine-readable device.

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving, by one or more processor of a server device, an indication of a positive connection state for a first member of a social messaging system, the positive connection state representing a local link between the first member and a second member of the social messaging system, the indication being stored on a first device associated with the first member;
    validating, by the one or more processor of the server device, the positive connection state by identifying a server link between the first member and the second member;
    in response to validating the positive connection state, transmitting an identification for the first member to a second client device associated with the second member;
    receiving a selection at a user interface presented on the second device, the selection representing an interaction with an application associated with the social messaging system to access a list of members of the social messaging system having viewed content generated by the second member;
    in response to receiving the selection from the second device, causing presentation of the identification for the first member within the user interface on the second device, the identification for the first member being presented in a first portion of the user interface associated with one or more identifications of members of the social messaging system having a link with the second member
    receiving, a content element associated with the second member;
    determining a distribution setting for the content element;
    in response to receiving the content element and the distribution setting, transmitting the content element to a third device associated with a third member of the social messaging system:
    determining a negative connection state for the third member, the negative connection state representing an absence of a link between the second member and the third member;
    in response to determining the negative connection state, transmitting an identification for the third member to the second client device associated with the second user;
    causing presentation of the identification for the third member within the user interface on the second device, the identification for the third member being presented in a second portion of the user interface associated with one or more identifications of members of the social messaging system lacking a link with the second member;
    identifying a set of members associated with a set of identifications presented within the second portion of the user interface;
    for each member of the set of members, performing a link analysis between a member represented in the second portion of the user interface and the second member;

generating a set of link scores based on the link analysis, each link score representing a distance between a member of the set of members and the second member;
generating an order based for the set of identifications based on the set of link scores;
causing presentation of the set of identifications based on the order;
identifying a member status for each member of the set of members associated with the set of identities presented within the second portion of the user interface;
identifying one or more members having a member status exceeding a status threshold;
generating a status icon for each member of the one or more members, the status icon indicating a member status exceeding a status threshold; and
causing presentation of the status icon proximate to an identification associated each member, of the one or more members, whose member status exceeds the status threshold.

2. The method of claim 1, wherein the distribution setting indicates at least one access permission type for the content element.

3. The method of claim 2, wherein a device of the one or more devices is the first device associated with the first member of the social messaging system, and wherein receiving the positive connection state for the first member further comprises:
identifying presentation of the content element at a user interface presented on the first device, the content element associated with the second member of the social messaging system;
determining the positive connection state for the first member, the positive connection state determined from information stored on the first device and accessible to the user interface; and
in response to determining the positive connection state, causing transmission of the indication of the positive connection state from the first device to the server device.

4. The method of claim 1, wherein determining the negative connection state for the third member further comprises:
identifying presentation of the content element at the user interface presented on the third device;
determining a positive connection state for the third member, the positive connection state representing a local link between the third member and the second member, the positive connection state determined from information stored on the third client device and accessible to the user interface; and
in response to determining the positive connection state, causing transmission of the indication of the positive connection state from the third device to the server device.

5. The method of claim 4, further comprising:
receiving, by the one or more processors of the server device, an indication of the positive connection state for the third member stored on the third client device associated with the third member; and
determining the local link represented by the positive connection state of the third member is mismatched with a server link between the third member and the second member, the server link indicating an absence of a connection between the third member and the second member.

6. The method of claim 1 further comprising:
generating a modified order based on identification of the one or more members having the member status exceeding the status threshold, the modified order generated from the order based on the set of link scores; and
causing presentation of the set of identifications based on the modified order.

7. A system comprising:
one or more processors; and
a non-transitory processor-readable storage medium, coupled to the one or more processors, storing processor executable instructions that, when executed by the one or more processors, cause the one or more processors to perform operations comprising:
receiving, by the one or more processors, an indication of a positive connection state for a first member of a social messaging system, the positive connection state representing a local link between the first member and a second member of the social messaging system, the indication being stored on a first device associated with the first member;
validating, by the one or more processors, the positive connection state by identifying a server link between the first member and the second member;
in response to validating the positive connection state, transmitting an identification for the first member to a second client device associated with the second member;
receiving a selection at a user interface presented on the second device, the selection representing an interaction with an application associated with the social messaging system to access a list of members of the social messaging system having viewed content generated by the second member;
in response to receiving the selection from the second device, causing presentation of the identification for the first member within the user interface on the second device, the identification for the first member being presented in a first portion of the user interface associated with one or more identifications of members of the social messaging system having a link with the second member
receiving, a content element associated with the second member;
determining a distribution setting for the content element;
in response to receiving the content element and the distribution setting, transmitting the content element to a third device associated with a third member of the social messaging system:
determining a negative connection state for the third member, the negative connection state representing an absence of a link between the second member and the third member;
in response to determining the negative connection state, transmitting an identification for the third member to the second client device associated with the second user;
causing presentation of the identification for the third member within the user interface on the second device, the identification for the third member being presented in a second portion of the user interface associated with one or more identifications of members of the social messaging system lacking a link with the second member;
identifying a set of members associated with a set of identifications presented within the second portion of the user interface;

for each member of the set of members, performing a link analysis between a member represented in the second portion of the user interface and the second member;

generating a set of link scores based on the link analysis, each link score representing a distance between a member of the set of members and the second member;

generating an order based for the set of identifications based on the set of link scores;

causing presentation of the set of identifications based on the order;

identifying a member status for each member of the set of members associated with the set of identities presented within the second portion of the user interface;

identifying one or more members having a member status exceeding a status threshold;

generating a status icon for each member of the one or more members, the status icon indicating a member status exceeding a status threshold; and causing presentation of the status icon proximate to an identification associated each member, of the one or more members, whose member status exceeds the status threshold.

8. The system of claim 7, wherein the distribution setting indicates at least one access permission type for the content element.

9. The system of claim 8, wherein a device of the one or more devices is the first device associated with the first member of the social messaging system, and wherein receiving the positive connection state for the first member further comprises:

identifying presentation of the content element at a user interface presented on the first device, the content element associated with the second member of the social messaging system;

determining the positive connection state for the first member, the positive connection state determined from information stored on the first device and accessible to the user interface; and in response to determining the positive connection state, causing transmission of the indication of the positive connection state from the first device to the server device.

10. The system of claim 7, wherein determining the negative connection state for the third member further comprises:

identifying presentation of the content element at the user interface presented on the third device;

determining a positive connection state for the third member, the positive connection state representing a local link between the third member and the second member, the positive connection state determined from information stored on the third client device and accessible to the user interface; and in response to determining the positive connection state, causing transmission of the indication of the positive connection state from the third device to the server device.

11. The system of claim 10, wherein the operations further comprise:

receiving, by the one or more processors of the server device, an indication of the positive connection state for the third member stored on the third client device associated with the third member; and determining the local link represented by the positive connection state of the third member is mismatched with a server link between the third member and the second member, the server link indicating an absence of a connection between the third member and the second member.

12. A non-transitory processor-readable storage medium storing processor executable instructions that, when executed by a processor of a machine, cause the machine to perform operations comprising:

receiving, by one or more processor of a server device, an indication of a positive connection state for a first member of a social messaging system, the positive connection state representing a local link between the first member and a second member of the social messaging system, the indication being stored on a first device associated with the first member;

validating, by the one or more processor of the server device, the positive connection state by identifying a server link between the first member and the second member;

in response to validating the positive connection state, transmitting an identification for the first member to a second client device associated with the second member;

receiving a selection at a user interface presented on the second device, the selection representing an interaction with an application associated with the social messaging system to access a list of members of the social messaging system having viewed content generated by the second member;

in response to receiving the selection from the second device, causing presentation of the identification for the first member within the user interface on the second device, the identification for the first member being presented in a first portion of the user interface associated with one or more identifications of members of the social messaging system having a link with the second member receiving, a content element associated with the second member;

determining a distribution setting for the content element;

in response to receiving the content element and the distribution setting, transmitting the content element to a third device associated with a third member of the social messaging system:

determining a negative connection state for the third member, the negative connection state representing an absence of a link between the second member and the third member;

in response to determining the negative connection state, transmitting an identification for the third member to the second client device associated with the second user;

causing presentation of the identification for the third member within the user interface on the second device, the identification for the third member being presented in a second portion of the user interface associated with one or more identifications of members of the social messaging system lacking a link with the second member;

identifying a set of members associated with a set of identifications presented within the second portion of the user interface;

for each member of the set of members, performing a link analysis between a member represented in the second portion of the user interface and the second member;

generating a set of link scores based on the link analysis, each link score representing a distance between a member of the set of members and the second member;

generating an order based for the set of identifications based on the set of link scores;

causing presentation of the set of identifications based on the order;

identifying a member status for each member of the set of members associated with the set of identities presented within the second portion of the user interface;

identifying one or more members having a member status exceeding a status threshold;

generating a status icon for each member of the one or more members, the status icon indicating a member status exceeding a status threshold; and causing presentation of the status icon proximate to an identification associated each member, of the one or more members, whose member status exceeds the status threshold.

13. The non-transitory processor-readable storage medium of claim 12, wherein, the distribution setting indicates at least one access permission type for the content element.

14. The non-transitory processor-readable storage medium of claim 13, wherein a device of the one or more devices is the first device associated with the first member of the social messaging system, and wherein receiving the positive connection state for the first member further comprises:

identifying presentation of the content element at a user interface presented on the first device, the content element associated with the second member of the social messaging system;

determining the positive connection state for the first member, the positive connection state determined from information stored on the first device and accessible to the user interface; and in response to determining the positive connection state, causing transmission of the indication of the positive connection state from the first device to the server device.

15. The non-transitory processor-readable storage medium of claim 12, wherein determining the negative connection state for the third member further comprises:

identifying presentation of the content element at the user interface presented on the third device;

determining a positive connection state for the third member, the positive connection state representing a local link between the third member and the second member, the positive connection state determined from information stored on the third client device and accessible to the user interface; and in response to determining the positive connection state, causing transmission of the indication of the positive connection state from the third device to the server device.

* * * * *